United States Patent Office 3,261,511
Patented July 19, 1966

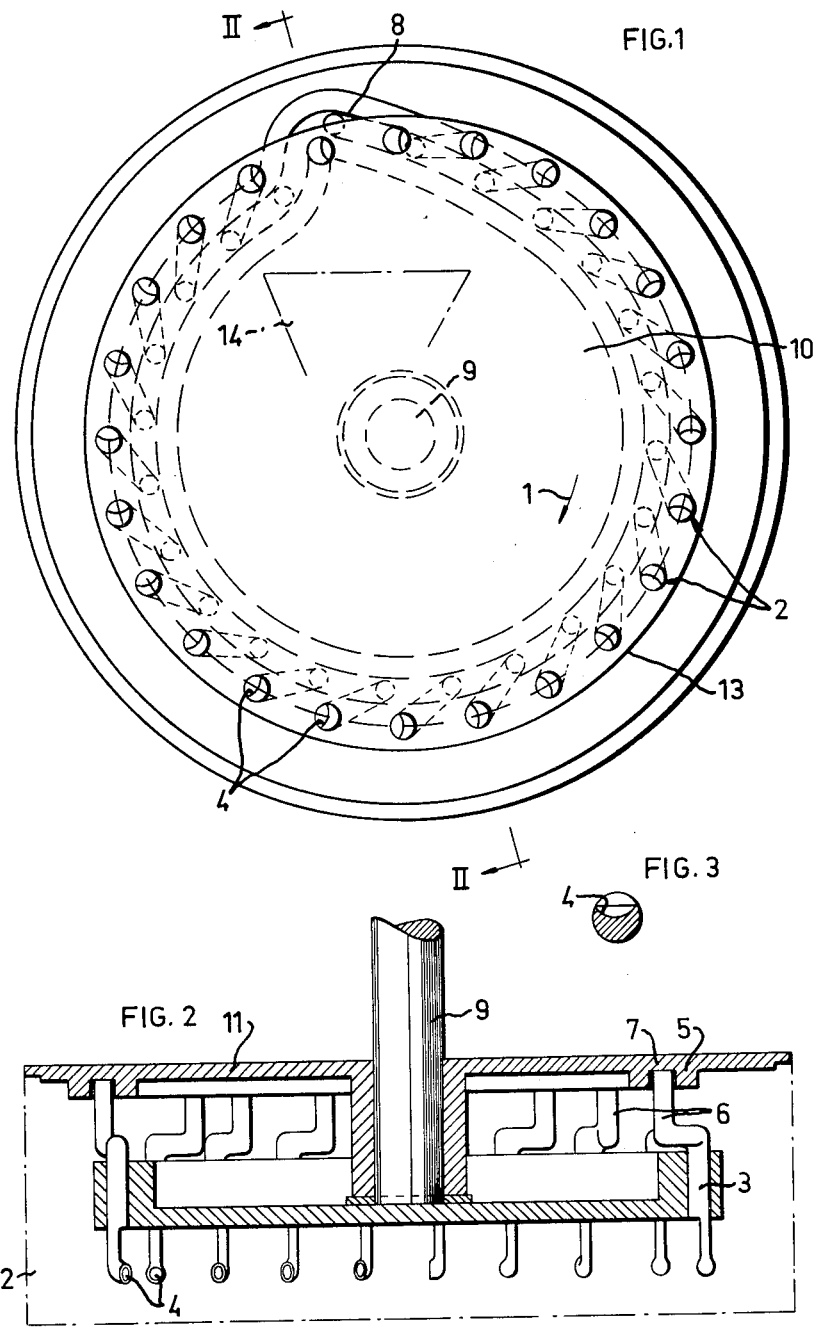

3,261,511
CONVEYING MECHANISMS
Anders Birger Andersson, Gullakra, Staffanstorp, Sweden, assignor to Nils Albert Bernerup, Nordana, Sweden, estate owner
Filed Dec. 1, 1964, Ser. No. 415,087
4 Claims. (Cl. 222—357)

This invention relates to a mechanism for conveying pulverulent, granular or lumpy goods and for delivering them at a point of delivery, and more particularly to a mechanism for conveying seeds, such as single-grain beet seeds, from a supply of such seeds to a drill coulter, said mechanism having a number of conveying means that can be caused to move in the conveying direction. According to the invention, the conveying means are constituted by cups movable in the conveying direction and mounted for pivotal movement about shafts, said cups being connected to cams actuated by guide means for swinging the cups between a receiving position and a delivery position and consequently for tilting the cups at the point of delivery to pour out the goods contained in said cups.

The invention has for its principal object to provide a conveying or delivery mechanism in a sowing apparatus, which permits an exact and regular delivery of individual seeds and seed portions (or individual pieces or portions of other goods to be conveyed). The invention makes it possible to attain regular intervals between e.g. sown single-grain beet seeds where such regular intervals are of particularly great importance to the future mechanized care of the growing beet plants.

These and further features of the invention and the advantages gained thereby will become apparent from the following description of a preferred embodiment with reference to the accompanying diagrammatic drawing. In the drawing:

FIG. 1 is a side elevation of the mechanism;
FIG. 2 is a section on line II—II in FIG. 1;
FIG. 3 is a section of a conveying means of the mechanism.

The mechanism shown in the drawing is intended for use in sowing single-grain beet seeds and consists of a number of conveying means 2 that can be caused to move in the conveying direction 1 marked by an arrow in FIG. 1. The conveying means 2 are constituted by cups 4 movable in the conveying direction 1 and mounted for pivotal movement about shafts 3, said cups being connected to cranks 6 actuated by guide means and serving to pivot the cups 4 between a receiving position in which the cup 4 occupies a substantially horizontal position, and a delivery position in which the cup occupies a substantially vertical position and consequently pours out the goods contained in the cup 4 at the point of delivery. The respective cup 4 is mounted for pivotal movement about a shaft 3 which extends at right angles to the conveying direction 1. The end of the shaft 3 opposed to the cup 4 is formed as a crank 6 which runs in a guide groove 7 formed by the guide means 5 and intended for all cranks. The guiding groove 7 at the point of delivery has a curved portion 8 for rotating the crank 6 and thus for tilting the cup 4.

The shafts 3 of the cups 4 are mounted in a disk 10 which is rotary about a shaft 9, and a guide groove 7 is provided in the side of a further disk 11 which faces the rotary disk 10. Said further disk 11 is stationary but adjustable by rotation about the shaft 9 of the disk 10 for setting the position of the curved portion 8 of the guide groove 7 and consequently for setting the point of delivery. The rotary disk 10 is arranged in a housing 12 shown merely diagrammatically in the drawing by broken lines, and in said housing the stationary but adjustable disk 11 constitutes a wall, the lower part of said housing 12 forming a secondary supply 13 which is connected to a primary supply of seeds (not shown). Provided in the upper part of the housing 12 at the delivery point for seeds is a hopper 14 which is shown by broken lines in FIG. 1 and serves to catch and carry away the seeds supplied at the point of delivery to a drill coulter (not shown).

The mechanism illustrated in the drawing and described above may be employed as a separate unit for sowing a row of seeds or be used in connection with a plurality of similar mechanisms for sowing several rows of seeds at the same time. The mechanism may be supported in any suitable manner, and the shaft 9—or the shafts 9 where several mechanisms disposed in the same implement are concerned—may be connected to enable rotation thereof for instance to the power take-off of a tractor or to any other suitable drive. When the mechanism is propelled in operation the disk 10 rotates in the conveying direction 1, and the cups 4 each receive from the seed supply 13 one seed which is carried along by the cups 4 to the upper part of the mechanism where the curved portion actuates the cranks 6 and pivots the cups 4 at the point of delivery above the hopper 14 from which the seeds pass to the drill coulter (not shown). Tilting of the seeds from the cups 4 takes place instantaneously at the same spot over the hopper 14, so that the seeds delivered from the drill coulter (not shown) will come to lie regularly spaced apart in the soil.

The mechanism illustrated in the drawing and described in the foregoing may be utilized for the conveyance of other pulverulent, granular or lumpy goods where it is of the utmost importance to have regular intervals between the delivered individual pieces or portions of the conveyed goods.

Modifications are conceivable within the scope of the invention, such as it is defined in the appendant claims.

What I claim and desire to secure by Letters Patent is:
1. A mechanism for supplying seeds or similar material to a point of delivery in a drill coulter comprising
   a wall having a guide means thereon and a shaft connected to said wall,
   a rotatable disk rotatable about said shaft and adjacent to and substantially parallel to said wall,
   said wall being stationary in operation but adjustably mounted for rotation about said shaft for positioning said guide means,
   a plurality of crank means between said guide means and said disk each having one end contacting said guide means for guiding the movement of said end and the other end formed as a shaft rotatably mounted in and passing through said disk,
   and a cup attached to said end formed as a shaft on each of said crank means and attached thereto so as to rotate with the shaft formation on each of said crank means.

2. A mechanism in accordance with claim 1, further characterized by said guide means being a continuous groove receiving said one end of each of said crank means.

3. A mechanism in accordance with claim 2, further characterized by said groove having a humped curved portion for guiding each of said crank means so as to tilt each of said cups over the point of delivery.

4. A mechanism in accordance with claim 1, further characterized by
    a housing for the seed or similar material supply,
    said wall constituting a wall of said housing,
    and a hopper means in the upper part of said housing for receiving the seed or similar material delivered at the point of delivery.

References Cited by the Examiner

UNITED STATES PATENTS

| 1,828,117 | 10/1931 | Mallinckrodt | 222—369 X |
| 2,275,887 | 3/1942 | Chandler | 222—369 X |
| 2,433,478 | 12/1947 | Nelson | 222—369 X |

FOREIGN PATENTS 325,820    9/1920    Germany.

M. HENSON WOOD, JR., *Primary Examiner.*

LOUIS J. DEMBO, *Examiner.*